United States Patent [19]

Lindgren

[11] Patent Number: 6,163,274
[45] Date of Patent: Dec. 19, 2000

[54] REMOTELY UPDATABLE PDA

[75] Inventor: Gary L. Lindgren, Newtown, Pa.

[73] Assignee: NCR Corporation, Dayton, Ohio

[21] Appl. No.: 08/923,790

[22] Filed: Sep. 4, 1997

[51] Int. Cl.[7] .................................................. G08B 5/22
[52] U.S. Cl. ............................................... 340/825.44
[58] Field of Search ........................... 340/825.44, 988,
340/989, 990, 991, 994, 995; 70/201, 207;
701/204; 455/38.1, 38.2, 344, 346; 370/313,
349; 379/93.13, 93.19, 93.23, 344, 346

[56] References Cited

U.S. PATENT DOCUMENTS

| | | | |
|---|---|---|---|
| 5,337,044 | 8/1994 | Folger et al. | 340/825.44 |
| 5,361,061 | 11/1994 | Mays et al. | 340/825.44 |
| 5,444,869 | 8/1995 | Stricklin et al. | 455/89 |
| 5,479,408 | 12/1995 | Will | 370/94.1 |
| 5,488,359 | 1/1996 | Faris et al. | 340/825.44 |
| 5,512,886 | 4/1996 | Macko et al. | 340/825.07 |
| 5,515,051 | 5/1996 | Tanaka et al. | 341/174 |
| 5,522,089 | 5/1996 | Kikinis et al. | 395/893 |
| 5,550,861 | 8/1996 | Chan et al. | 375/222 |
| 5,559,501 | 9/1996 | Barzegar et al. | 340/825 |
| 5,581,594 | 12/1996 | McAfee | 379/57 |
| 5,590,382 | 12/1996 | Kikinis et al. | 395/893 |
| 5,598,534 | 1/1997 | Haas | 395/200.09 |
| 5,604,492 | 2/1997 | Abdul-Halim | 340/825.44 |
| 5,790,974 | 8/1998 | Tognazzini | 701/204 |

*Primary Examiner*—Michael Tokar
*Assistant Examiner*—Jean B. Jeanglaude
*Attorney, Agent, or Firm*—Flehr Hohbach Test Albritton & Herbert

[57] ABSTRACT

A PDA's calendar/agenda data are remotely updatable, preferably in real time. Data changes and or updates are input at a base computer station that includes a pager card with modem and preferably wireless transmission capability. The base computer station transmits data with an appropriate pager ID to a pager system that preferably wirelessly re-broadcasts the data. The PDA receives the re-broadcast data, which preferably is broadcast substantially in real-time. Software stored in and executable by the PDA recognizes the incoming calendar/agenda data and stores the update and new data. Simultaneously, the PDA display flashes an alert to the user that data has just been updated, and the PDA sound transducer can also sound an alert. Preferably the PDA software recognizes any scheduling conflict and, in addition to alerting the user to such conflict, causes the PDA to transmit to the pager service a query concerning the conflict.

15 Claims, 3 Drawing Sheets

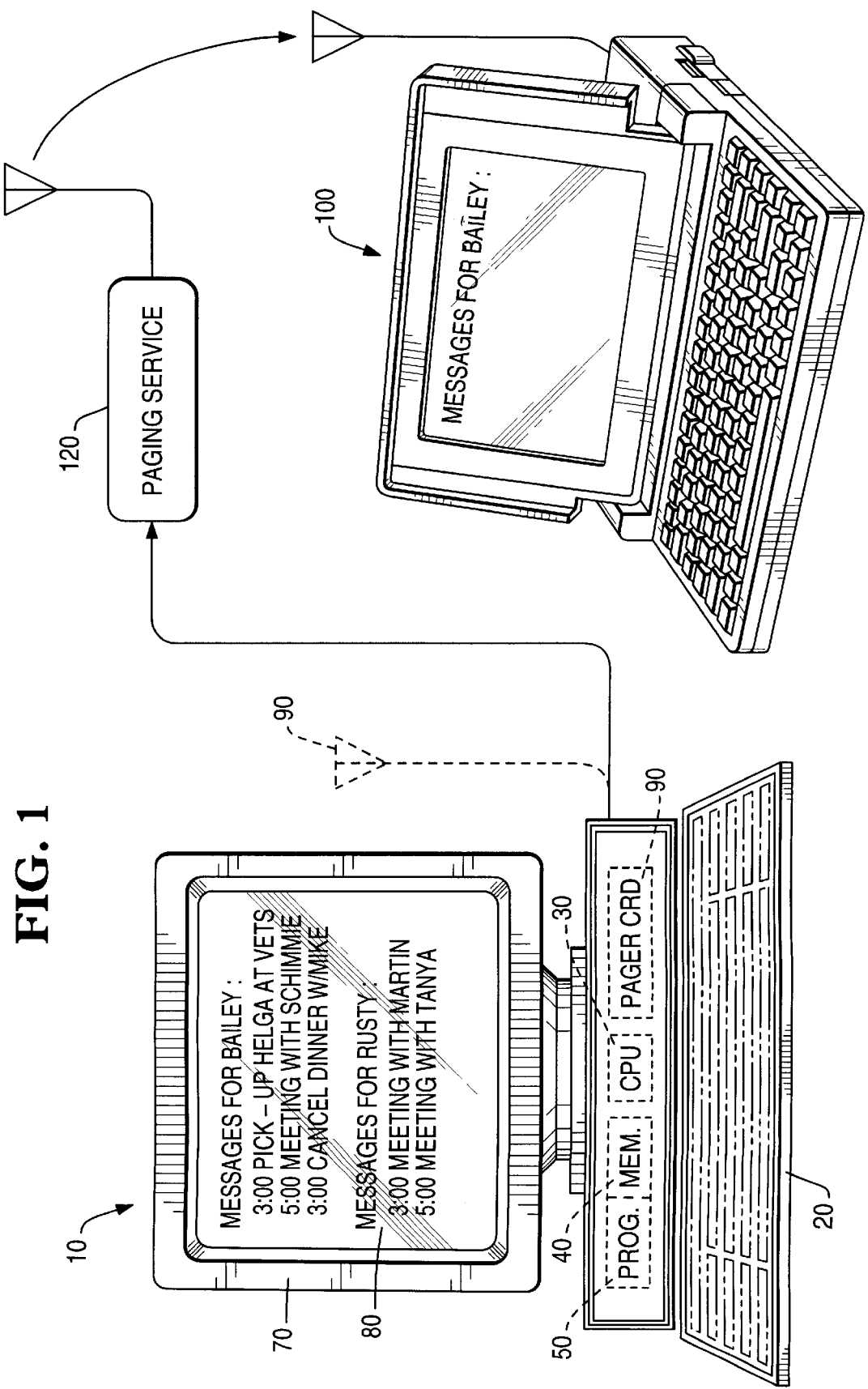

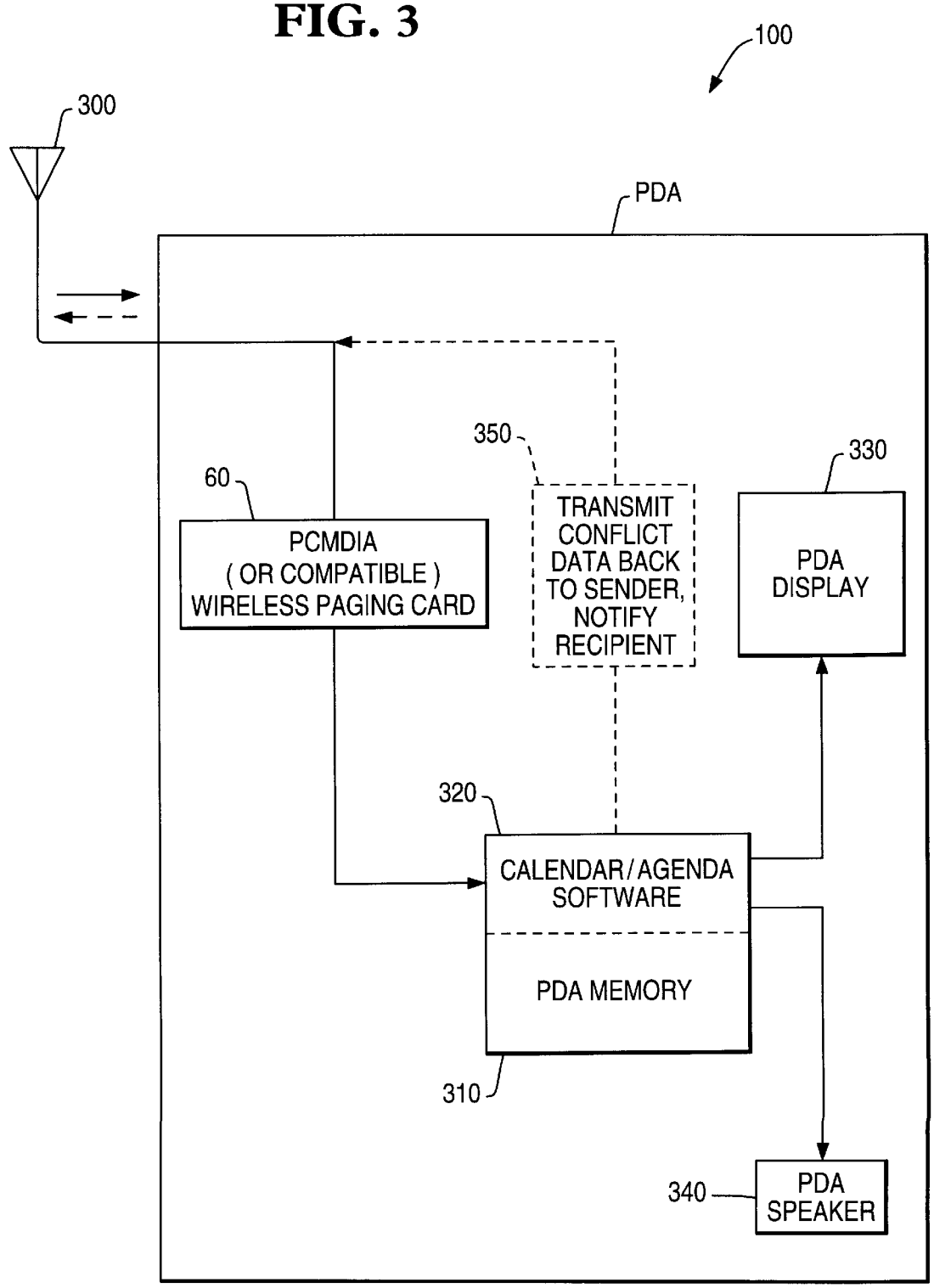

REMOTELY UPDATABLE PDA

FIELD OF THE INVENTION

This invention relates to personal digital assistant ("PDA") type devices having a calendaring or agenda function, and more particularly to remotely updating or modifying calendar or agenda contents in a PDA.

BACKGROUND OF THE INVENTION

PDA devices continue to become more powerful and more compact. The Newton PDA produced by Apple Computer Co. provides handwriting recognition, while other PDA's include a miniature keyboard, the PSION 3C for example. Because they generally are small enough to fit within a coat pocket, among other functions, most PDAs are intended to replace a conventional paper diary or paper calendar of scheduled events.

Updating a PDA typically involves invoking the calendar or agenda routine stored within the device, and manually inputting or changing appointment reminders, using a stylus or miniature keyboard. (Hereafter, the term "calendar" will be understood to include "agenda" type scheduling as well, e.g., dates and times of meetings, anticipated duration of meetings, and so forth.) Updating calendar information while the user is in the office is relatively straightforward: the user or user's secretary simply inputs the data into the PDA. However, updating information while the user is traveling can be more challenging. The user's office may try to telephone the user to provide update information, but the user may not always be available by telephone.

A more useful way to help a user update a PDA calendar while on the road is to transmit the update message via a wireless numeric or alphanumeric pager, e.g., "3:00 meeting Friday with Martin has been canceled, meet Jake at 11:30 instead." However, the user (also referred to herein as a "recipient") might be out of pager range. Even if within receiving range, the user must then manually input the pager-received data into the PDA. If the user is too busy to do so immediately, the pager-provided calendar data might be forgotten before updating can be carried out. As a result, an important appointment might be missed.

Thus, there is a need for a wireless automatic method and system to update PDA calendar information. Updating should not require active intervention on a user's part, other than consulting the PDA calendar to be aware of forthcoming appointments. Preferably updating should combine the power of a PDA with the convenience of a paging device.

The present invention provides such a wireless PDA updating system and method.

SUMMARY OF THE PRESENT INVENTION

The present invention provides a user's PDA with a wireless PCMCIA (or compatible equivalent) wireless alphanumeric paging card. On the transmitting side, at the user's home or office ("home station"), new or modified calendar data ("calendar event(s)") is input to a modem-equipped computer system. This input may be accomplished simply by updating data in an appropriate calendar software program. The home station sends the calendar event data to a page subscription service, which broadcasts the data to the intended user. On the receiving side, calendaring software stored within and executable by the PDA intercepts incoming pages. Calendar-update data therein is recognized, and is software-forwarded automatically to the PDA calendar program. The PDA calendar data is updated in real-time upon receipt of incoming page data, but may be updated periodically thereafter.

Optionally, the PDA can recognize and identify to the user, and transmit to the sender conflict-identified data. The resultant system is relatively inexpensive to implement, functions automatically, and melds the power of a PDA with the convenience of a pager.

Other features and advantages of the invention will appear from the following description in which the preferred embodiments have been set forth in detail, in conjunction with the accompanying drawings.

BRIEF DESCRIPTION OF THE DRAWINGS

FIG. 1 depicts send and receive systems used to implement the present invention;

FIG. 3 is a block diagram of a PDA showing implementation of the present invention.

DETAILED DESCRIPTION OF THE PREFERRED EMBODIMENT

Figure 2A:
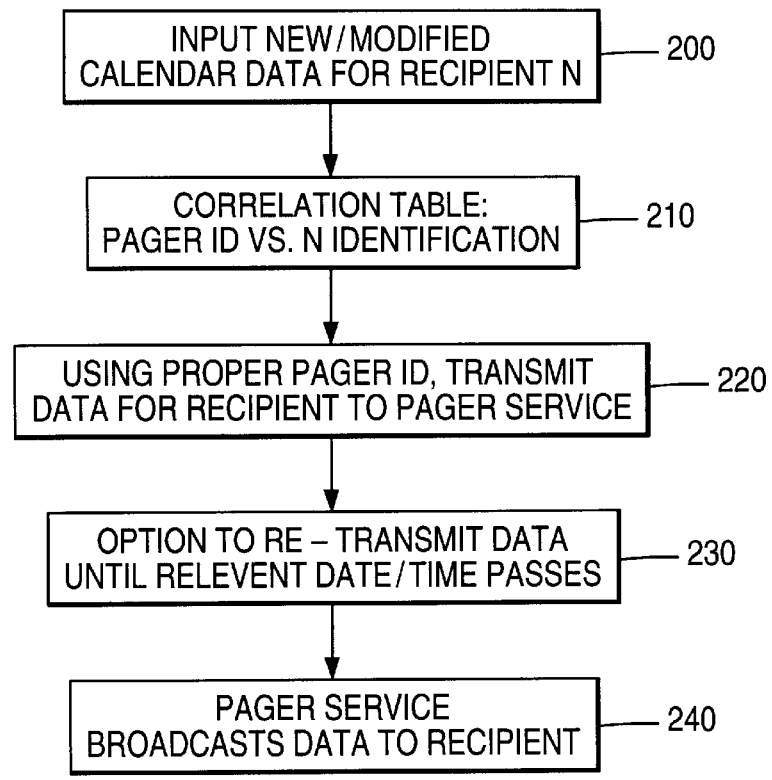
FIG. 2A is a flow diagram of process steps followed by the base or sending station, in transmitting data according to the present invention.

FIG. 1 depicts an overall system used to implement a preferred embodiment of the present invention. On the sending side, typically at the intended recipient's home or office or message service center (collective, "base station") there will be a computer system 10, or equivalent. Computer system 10 typically includes at least one data input device, e.g., a keyboard 20, used to input new or revised calendar data, a central processor unit ("CPU") 30, and memory 40 that retains a stored calendar/agenda program 50 that is executable by CPU 30. Computer system 10 also includes a PCMCIA or equivalent alphanumeric pager card 60, as well as a monitor 70 that can display calendar data 80 for convenience of the person inputting new or modified data.

Pager card 60 preferably includes modem capabilities and for maximum flexibility may include wireless modem capability, and will be associated with antenna 90 for wireless (as opposed to wired-telephony) communication.

Initially memory 40 may include such calendar/agenda data as are already stored in memory within the user's (e.g., data recipient's) PDA 100. Typically such starting data will have been downloaded from the PDA, or may have been entered into system 10 and perhaps therefrom uploaded into the PDA when it was in proximity to system 10.

As used herein, PDA 100 will mean a standalone portable personal digital assistant unit, able to execute an internally stored calendar/agenda program. It is understood, however, that PDA 100 could in fact be a laptop computer, although portability will be less convenient than a small, lighter weight PDA.

Sooner or later the base station (or equivalent) will find it necessary to add to or to modify calendar data and to communicate such new or modified data to the PDA. It is the purpose of the present invention to automatically update the calendar/agenda data stored in the PDA in real-time or substantially in real-time as changes are made to data stored in system 10.

In practice, new or update data is input to system 10, e.g. using the keyboard 20. The data is then transmitted by telephone wire or wirelessly, preferably to a pager service 120. Preferably the data is transmitted by system 10 in real-time to service 120, although it may be stored by system 10 and transmitted at preset time intervals, e.g., quarter-hourly, half-hourly, etc.

As received by the pager service, the data preferably will have been correlated to a page identification number associated with the recipient. In real-time or at intervals thereafter (e.g., the next nearest half-hours, hour, etc.), pager system 120 transmits the data, preferably wirelessly to PDA 100. PDA 100 can then immediately alert the recipient-user, using visual and/or audio signals, that new or updated data have been received. Optionally, if the new or updated data represents a time conflict with data already within the PDA, the PDA can immediately warn the recipient-user. Further, optionally, the PDA can immediately transmit back to the pager service and/or base station notice that a conflict appears to now exist.

FIG. 2A depicts the procedures that preferably are carried out at the base station, according to the present invention. At method step 200, new and/or modified data intended for a given recipient, e.g., recipient N, is input to computer system 10. The data may be input using keyboard 20, or is perhaps input using a computer diskette, infrared, among other modes of inputting.

It is understood that computer system 10 may in fact be used to store calendar data within memory 40 and/or software 50 for a plurality of users, one of whom is user N. Within system 10, users may be differentiated by an identification number, but more conveniently by user name or user initials.

At method step 210, a correlation table, preferably stored within memory 40, identifies the intended recipient of the newly entered calendar/agenda data with a pager identification number. The correlation table may store various user's names or initials as well as a pager-assigned unique identification number (alphanumeric or otherwise) associated with each user.

At method step 220, now using the appropriate pager-identification obtained from step 210, the data is transmitted by system 10, using modem and wired or wireless transmission facilities associated with pager/modem card 60. In the broadest application, transmission is to a pager service 120, that can re-broadcast the data intended to update the recipient's PDA. Broadcast range of system 120 may be local, nationwide, or indeed worldwide, and the broadcast format preferably will be a pager-compatible format.

Optionally, step 230 causes system 10 to retransmit data, absent confirmation of receipt from the PDA and/or pager system. Re-transmission can be on a periodic basis, e.g., hourly, daily, with data not requiring re-transmitted beyond the relevant date and time of the data. Thus, a portion of data relating to a re-scheduled party on June 16th at noon need not be broadcast after June 16th, and indeed not after perhaps 1:00 PM or 2:00 PM on June 16th. Re-broadcast within a few hours of the relevant time might be useful to permit the intended recipient to at least try to contact those involved in the missed appointment, to apologize and/or attempt to reschedule.

Figure 2B:
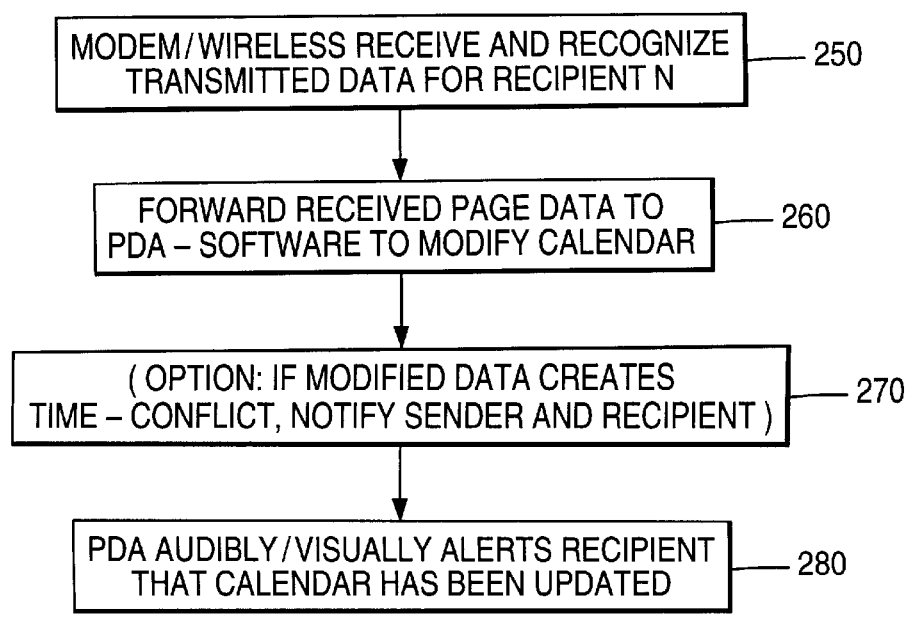
FIG. 2B is a flow diagram of process steps followed by a PDA in receiving and processing calendar data, according to the present invention.

Turning now to FIG. 2B, events occurring on the recipient side are shown. At step 250, the wireless/modem function within PDA 100 receives the pager service transmission intended for recipient N, as properly identified by an associated pager number. In the most flexible embodiment, transmission from pager service 120 is via radio. In a closer transmission range environment, perhaps where there are a number of PDAs and recipients, all within a general office complex, other transmission media might be utilized. For example, in line of sight environments, infrared might be used.

Step 250 recognizes from the received data that there is new and/up update calendar/agenda data for the intended recipient. Reception at step 250 occurs in real-time if PDA 100 is within broadcast range of service 120 (or equivalent), and/or may occur subsequently during one or more re-broadcasts.

At step 260, the relevant data for the intended recipient is forwarded to the calendar/agenda software stored within the PDA. At optional step 260, the PDA-stored software preferably recognizes and identifies any conflicts between existing PDA-stored data and incoming data. For example, a conflict may be two different meetings scheduled for the same or overlapping times, or a meeting in the morning at location X and a meeting a few hours later at location Y, where X and Y are too far apart to be at each location at the scheduled time. Step 270 optionally includes immediately causing PDA to display a visual and/or sound an audible warning, alerting the recipient that a calendaring conflict now exists. Further, if PDA 100 includes transmission capability, the PDA can now transmit a warning to the pager service (and optionally to system 10) that one or more specific conflicts have been identified. Upon learning of such conflict, either from a PDA transmission or a pager system re-broadcast from the PDA, system 10 can then rectify the conflict, if indeed it exists. Of course, the conflict may be spurious in that PDA 100 retained stale data at the time the new or modified data were received, in which case no true conflict was present.

At step 280, PDA 100 visibly and/or audibly alerts the user that a calendaring update has occurred. As shown in FIG. 3, the alert (as well as any alert at optional step 270) may comprising displaying an appropriate alpha-numeric or icon symbol on the PDA screen, and/or sounding an appropriate audible sound using the PDA speaker/transducer.

FIG. 3 is a block diagram of PDA 100, as used with the present invention. Incoming wireless signals, e.g., from service 120 are received by PDA antenna 200. Alternatively, PDA 100 may be coupled to telephone lines (not shown). As noted, PCMCIA (or equivalent) pager/modem card 60 includes necessary interfaces and preferably can accommodate wireless and wired transmission. If wired transmission is employed, base computer system 10 may utilize a telephone line directly, without need for a re-broadcast pager system 120. However, it would be necessary for PDA 100 to be coupled via modem to a telephone line to receive such line-to-line transmission, in real-time. Understandably, the user of a pager service and wireless broadcasting permits considerably greater flexibility in PDA calendar updating. Towards that end, pager 100 will normally include a wireless pager card 60 and an antenna 300.

PDA 100 includes memory 310, a portion of which stores the relevant calendar/agenda program 320, whose contents are to be updated according to the present invention. Optionally, if software 320, executed by a CPU within PDA 100, determines a calendaring conflict now exists, transmission unit 350 can transmit identification of the conflict back to pager service 120 via antenna 300. As noted, if wire-to-wire transmission is used, identification of the conflict can be sent by PDA 100 directly to computer system 10, without involvement of pager service 120. PDA display 330 preferably displays in real-time notice to the user of any conflict as well as notice that calendaring information has been updated. Software 320 updates the stored data, and can cause the updated information to be immediately shown on display 330. Simultaneously, PDA speaker/transducer 340 can audibly alert the user that calendar/agenda information has just been received by PDA 100. Preferably a special tone or tone pattern is sounded by transducer 340 to indicate a conflict, or to indicate new data that requires some action on the part of the user within a predetermined time, e.g., a new meeting within two hours hence.

Modifications and variations may be made to the disclosed embodiments without departing from the subject and spirit of the invention as defined by the following claims.

What is claimed is:

1. A method of automatically updating calendar data for a plurality of users, the calendar data being associated with a calendar program executable by a personal digital assistant (PDA) with calendar data resident in a base computer system, comprising:

(a) associating with updated and/or new calendar data in the base computer system with identification identifying an intended recipient of the data identified from the plurality of users;

(b) transmitting, using a wireless broadcast system, the updated and/or new calendar data for reception and use by the PDA; and (c) the receiving the transmitted updated and/or new calendar data and updating the calendar data associated with the calendar program executable by the PDA.

2. The method of claim 1, comprising transmitting of the pager-ID for a given user of the PDA.

3. The method of claim 1, comprising transmitting said data to a pager service that re-broadcasts the updating data to said PDA.

4. The method of claim 1, comprising wirelessly transmitting, by the base computer station, said calendar data.

5. The method of claim 1, comprising identifying any conflict between calendar data stored in the PDA with newly received calendar data, and if a conflict is identified, causing the PDA to provide at least one warning selected from the group consisting of (i) a visual warning displayable on a screen of the PDA, and (ii) an audible warning sounded by the PDA.

6. The method of claim 1, comprising identifying any conflict between calendar data stored in the PDA with newly received calendar data and transmitting information to alert the base computer system of the identified conflict.

7. The method of claim 1, wherein a conflict is a time conflict between existing PDA stored data and the received updated and/or new calendar data.

8. The method of claim 7, wherein said PDA is updated substantially in real-time.

9. A computer-implemented system of automatically updating calendar data for a plurality of users, the calendar data being associated with a calendar program executable by a personal digital assistant (PDA) with calendar data residing in a base computer system, the PDA and the base computer each having a processor and a memory coupled to said processor, each of the memories having stored therein sequences of instructions, which, when executed by said processors, causes said processors to perform the steps of:

(a) associating updated and/or new calendar data in the base computer system with identification identifying an intended recipient of the data identified from the plurality of users;

(b) transmitting, using a wireless broadcast system, the updated and/or new calendar data for reception and use by the PDA;

(c) the PDA receiving the transmitted updated and/or new calendar data and updating the calendar data associated with the calendar program executable by the PDA.

10. The system of claim 9, comprising transmitting of the pager-ID for a given user of the PDA.

11. The system of claim 9, wherein said PDA is updated substantially in real-time.

12. The system of claim 9, further including a pager system;

wherein said computer system transmits said pager-ID and said calendar data to pager system, said pager system wirelessly transmitting said data to said PDA to permit updating said calendar program stored in said PDA.

13. The system of claim 12, wherein:

said calendar program executable by said PDA recognizes any conflict between data previously stored in said PDA and new or modified data received by said PDA, and said PDA sounds a visual and/or audible warning upon detection of a said conflict;

said PDA includes a transmitter; and when a said conflict is recognized, said PDA transmits information to said pager system to alert said base computer system as to a recognized conflict.

14. The system of claim 9, wherein:

said calendar program executable by said PDA recognizes any conflict between data previously stored in said PDA and new or modified data received by said PDA;

said PDA alerting a user of said PDA of any conflict recognized by said calendar program executable by said PDA.

15. The system of claim 14, wherein:

said PDA includes a transmitter; and when a conflict is recognized, said PDA transmits information to alert said base computer system as to a recognized conflict.

* * * * *